United States Patent
Owada et al.

(10) Patent No.: US 7,100,055 B2
(45) Date of Patent: Aug. 29, 2006

(54) INFORMATION STORAGE SYSTEM, INFORMATION TRANSFER SYSTEM AND STORAGE MEDIUM THEREOF

(75) Inventors: Toru Owada, Yokohama (JP); Jun Kitahara, Yokohama (JP); Takeshi Asahi, Fujisawa (JP); Takayuki Tamura, Kodaira (JP); Nagamasa Mizushima, Fujisawa (JP); Ikuya Kawasaki, Kodaira (JP); Takashi Totsuka, Machida (JP)

(73) Assignee: Hitachi, Ltd., Tokyo (JP)

( * ) Notice: Subject to any disclaimer, the term of this patent is extended or adjusted under 35 U.S.C. 154(b) by 768 days.

(21) Appl. No.: 09/943,754

(22) Filed: Sep. 4, 2001

(65) Prior Publication Data
US 2002/0034306 A1 Mar. 21, 2002

(30) Foreign Application Priority Data
Sep. 21, 2000 (JP) .............................. 2000-286479

(51) Int. Cl.
*G06F 17/00* (2006.01)
(52) U.S. Cl. ........................ 713/189; 713/168; 713/150
(58) Field of Classification Search ................ 713/182, 713/165, 168, 167, 189, 150; 709/201; 705/51; 380/286
See application file for complete search history.

(56) References Cited

U.S. PATENT DOCUMENTS

| 6,289,450 | B1 * | 9/2001 | Pensak et al. ............... 713/167 |
| 2002/0071567 | A1 * | 6/2002 | Kurn et al. .................. 380/286 |
| 2002/0178366 | A1 * | 11/2002 | Ofir ........................... 713/182 |

FOREIGN PATENT DOCUMENTS

| JP | 11-259964 | 9/1999 |
| JP | 2000-90039 | 3/2000 |

OTHER PUBLICATIONS

Keutzer, "Advanced Topics in CAD Component Based Design of Electronic Systems Lecture 9.2", 1999, [Retrieved from Internet Feb. 7, 2005], http://www-cad.eecs.berkeley.edu/~newton/Classes/EE290sp99/lectures/ee290aSp9913_2/tsld001.htm.*
www.faqs.org/rfcs/rfc2630.html.*
An authentication server in Java implementation of an encryption framework model and DES algorithm in Java; Batista De Almeida, L. et al.; Telecommunications Symposium, 1998. Proceedings. SBT/IEEE International vol. 2, Aug. 9-13, 1998 pp. 627-631.*
On the (non)universality of the one-time pad; Dodis, Y.; Spencer, J.; Foundations of Computer Science, 2002. Proceedings. The 43rd Annual IEEE Symposium on Nov. 16-19, 2002 pp. 376-385.*
Introducing smartcards to remote authenticate passwords using public key encryption; Badra, M.; Urien, P.; Advances in Wired and Wireless Communication, 2004 IEEE/Sarnoff Symposium on Apr. 26-27, 2004 pp. 123-126.*

* cited by examiner

Primary Examiner—David Jung
(74) Attorney, Agent, or Firm—McDermott Will & Emery LLP

(57) ABSTRACT

A storage medium includes a storage device for storing information, information required for encryption and encrypted information, and an I/F device for inputting and outputting information, information required for coding and store encrypted information in a storage device or from an external apparatus other than the storage device, and an encoding device for coding of information and decoding of encoded information. When outputting information stored inside the storage device, information is encoded using encryption key information, and along with obtaining the encoded information and obtaining the encoded encryption key information by using another encryption key. Both the encoded information and encoded encryption key information are output so that decoding the information without the storage medium is impossible.

8 Claims, 10 Drawing Sheets

INFORMATION STORAGE SYSTEM, INFORMATION TRANSFER SYSTEM AND STORAGE MEDIUM THEREOF

BACKGROUND OF THE INVENTION

1. Field of the Invention

The present invention relates to an information storage system, information transfer system and to a storage medium utilized in those systems for distributing information on a semiconductor storage medium, and relates in particular to a method for preventing illegal copying while storing information of high added value onto general information storage mediums such as large capacity magnetic storage in personal computers not having a function to prevent copying of information, and to a method for transferring the same information between storage mediums without copying.

1. Description of Related Art

One method of the related art for distributing information with high added value while preventing illegal copying is a system disclosed in unexamined Japanese Patent publication No. 2000-90039. A brief explanation of the operation of the device is given while referring to FIG. 9.

A block diagram showing a system for preventing unauthorized use by copying is shown in FIG. 9. In the system in FIG. 9, a music server 903 and a client 902 are connected by an Internet 901. A public key and a secret key are made based on the characteristic ID of the playback equipment 911, by the client 902. The public key is sent from a personal computer 910 to a server 903 and registered (stored). The secret key is retained in a playback equipment 911. The client 902 makes a request to the server 903 for distribution of the music data. Encryption with the registered public key is performed for music data extracted from a music data base 922. The encrypted music data is sent to the client 902 and stored in the playback equipment 911. During play, the music data is decrypted with the secret key held in the playback equipment 911 while being played. The music data stored in the playback equipment 911 was encrypted with a key made based on the unique ID of the playback equipment 911 and therefore cannot be played back on other playback equipment.

Another method for transferring information with high added value is disclosed in unexamined Japanese Patent publication No. H11-259964. The operation of the device is briefly described while referring to FIG. 10.

A flowchart of the information transfer system of the related art is shown in FIG. 10. In this device, when data is copied by transfer to the transfer destination, the playing back of the transfer source data is prohibited. A unique identifier is set beforehand into the device at the transfer destination. In step 1050, when the transfer source device is connected to the transfer destination device, an identifier is sent from transfer destination device in step 1051. In step 1052, a search is made in the (pre-registered) identifier control table for the identifier that was sent, and in step 1053 whether or not this identifier was found is determined. If not found, the process shifts to step 1061 and transfer is prohibited. In step 1053, if the identifier is found, a song is selected in step 1054, and a transfer command is made. Next, in step 1055, the data to be transferred is searched for from the data control table at the transfer source, and the flag is checked in step 1056. If the flag is a "1" in step 1057, then the process shifts to step 1061 and transfer of that data is prohibited since transfer has already occurred. If the flag is a "0", then the data is transferred instep 1058, and instep 1059 the data control table is rewritten.

The related art had the problem that imparting added (unique) value to information was difficult since information stored on a semiconductor storage medium was easily copied onto another semiconductor storage medium. Stated conversely, in order to prevent information of high added (unique) value from being easily copied this information was not distributed by semiconductor storage mediums.

In a method of the related art to distribute information of high added (unique) value while preventing illegal use by copying, the server 903 encoded the information of high added (unique) value based on the unique ID of the playback equipment 911 so that listening in on the communication system path and illegally using the same information could be prevented.

When passing encoded information from the transfer source device to the transfer destination device, a two-step combination, of "Encoding and transferring unique (added) value information such as music data by means of a common key encoding method." and "Encoding and sending the common key used for encoding by the public key encoding method." was generally used on account of the processing speed and simple key management. Since in the latter encoding, an encoding key capable of being decoded at the transfer destination device was utilized (keys were shared), information of significant value could be utilized at the transfer destination device.

In the method of the related art, for transferring information of high added (unique) value without copying the information between storage mediums, the transfer of data could be achieved by data copy permit/prohibit flags, and by installing a function to prohibit data at the data transfer source after copying the data. However, in both of these methods of the related art, the communication path for information between the transfer source and the transfer destination was not adequately protected and information of high added (unique) value could be illegally acquired by intercepting (listening in) information on the same communication path. Further, This procedure has a point when usable data was present at the data transfer source and the data transfer destination, so the data at data transfer source and the data transfer destination were both capable of being utilized due to an interruption in communications between the data transfer source and the transfer destination.

SUMMARY OF THE INVENTION

In order to resolve the problems of the related art, it is therefore an object of the present invention to provide a storage medium and information processing technology utilizing that storage medium capable of outputting information stored in the storage medium in a format unusable by other information devices or storage mediums (not sharing data encryption and key) by adding functions to the storage medium itself.

It is a further object of the present invention to provide a storage medium and information processing technology utilizing that storage medium capable of transferring information stored on the storage medium rather than copying the information so that the uniqueness of the information is always assured, and copying of the information by interception on the communication path is prevented.

To achieve the above mentioned objects of the invention, in a first aspect of the invention, a storage medium is comprised of a storage device for storing information, an encryption key required for encoding, and encoded information; an input/output device for inputting and outputting information stored in the storage device, the encryption key, and encoding information; and an encoding device for encoding of information and decoding of encoded information. When outputting information stored inside the storage device to outside the storage medium, along with obtaining information encoded by using the encryption key, the encryption key used when encoding information is encoded by using another encryption key thereby to obtain an encoded encryption key, and both the encoded information and encoded encryption key are output.

In a second aspect of the invention, a storage medium is comprised of a storage device for storing information, an encryption key required for encoding, and encoded information; an input/output device for inputting and outputting information stored in the storage device, the encryption key, and encoded information; and an encoding device for encoding of information and decoding of encoded information. When outputting information stored inside the storage device to outside the storage medium, along with obtaining information encoded by using the encryption key, the encryption key used when encoding information is encoded by using another encryption key thereby to obtain an encoded encryption key, and first, only the encoded information is output, and when a signal showing encoded information was input is input from an external apparatus, the encoded encryption key is output after voiding the information stored in the storage device.

In the first and second aspects of the invention, the input/output device, the encoding device, and the storage device are constituted on the same semiconductor chip.

In a third aspect of the invention, an information storage system has a storage medium comprised of a storage device for storing information, an encryption key required for encoding, and encoded information; an input/output device for inputting and outputting information the encryption key, and encoding information stored in the storage device; and an encoding device for encoding of information and decoding of encoded information; and an external apparatus connected to the storage medium. Information encoded by utilizing an encryption key, and an encryption key utilized when encoding the information, are sent with an encryption key encoded utilizing another encryption key and stored in the external apparatus.

In a fourth aspect of the invention, an information transfer system has a storage medium comprised of a storage device for storing information, an encryption key required for encoding, and encoded information; an input/output device for inputting and outputting information stored in the storage device, the encryption key, and encoding information; and an encoding device for encoding of information and decoding of encoded information; and an external apparatus to receive information stored in the storage medium. When transferring the information to the external apparatus, the encoded information encoded by utilizing an encryption key is sent to the external apparatus, and after a signal showing the encoded information was received is received from the external apparatus, the information stored in the storage device is voided, and the encryption key is sent to the encoded external apparatus.

DETAILED DESCRIPTION OF THE PREFERRED EMBODIMENTS

Hereafter, the embodiments of the present invention are described while referring to the accompanying work drawings.

Figure 1:
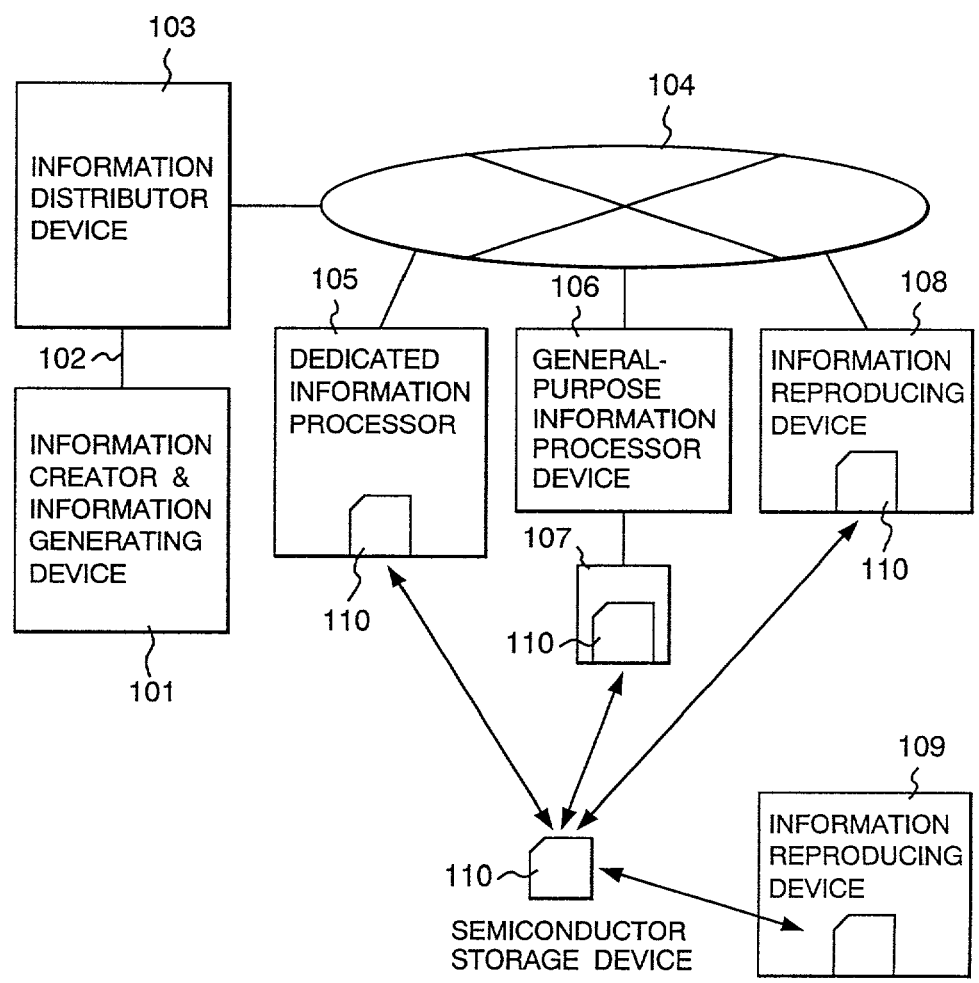
FIG. 1 is a block diagram showing an overview of the embodiment of the information processing system of the present invention.

FIG. 1 is a block diagram showing an overview of the embodiment of the information processing system for the present invention. As shown in FIG. 1, the information processing system is comprised of an information creator and information generating device 101, an information distributing device 103 connected by way of a transfer means 102, at least one dedicated information processing device 105 unit connected by a communications line 104 with the information distributing device 103, at least one semiconductor storage medium 110 unit, and at least one information reproducing device 109 unit.

Aside from the dedicated information processing device 105, a general-purpose information processing device 106 such as a personal computer comprised of a semiconductor storage medium access means 107, and information reproducing device 108 may also be provided.

Information is generated by the information creator and the information generating device 101 and stored in the information distributing device 103. A communication line may also be used at this time for transferring information, or information may also be sent by a magnetic storage medium such as a floppy disk. The information distributing device 103 processes the information or adds supplemental information according to the request from the dedicated information processing device 105, general-purpose information processing device 106 or information reproducing device 108 and sends the information by way of the communication line 104.

The dedicated information processing device 105, general-purpose information processing device 106 and information reproducing device 108 transfer the information to the connected semiconductor storage medium 110. The dedicated information processing device 105 accumulates a plurality of information and may also process the information or add supplemental information. The general-purpose information processing device 106 and the information reproducing device 108 send the information transferred from the information distributing device 103 basically unchanged to the semiconductor storage medium 110. Information is exchanged at this time between the information distributing device 103 and dedicated information processing device 105, between the dedicated information processing device 105 and semiconductor storage medium 110, and between the information distributing device 103 and semiconductor storage medium 110 for mutual recognition and authentication of the other device.

The semiconductor storage medium 110 stored with distributed information added with the processed or supplemental information, is connected to the information reproducing device 109, and sends the stored information at the request of the information reproducing device 109. Information is exchanged at this time between the information reproducing device 109 and semiconductor storage medium 110 for mutual recognition and authentication.

Methods for safely distributing information generated by the information creator to the semiconductor storage medium 110 are not dealt with in particular by the present invention, the distributed information is assumed to be stored in the semiconductor storage medium 110.

The first embodiment of the present invention is described while referring to FIG. 2 through FIG. 4, and FIG. 8.

Figure 2:
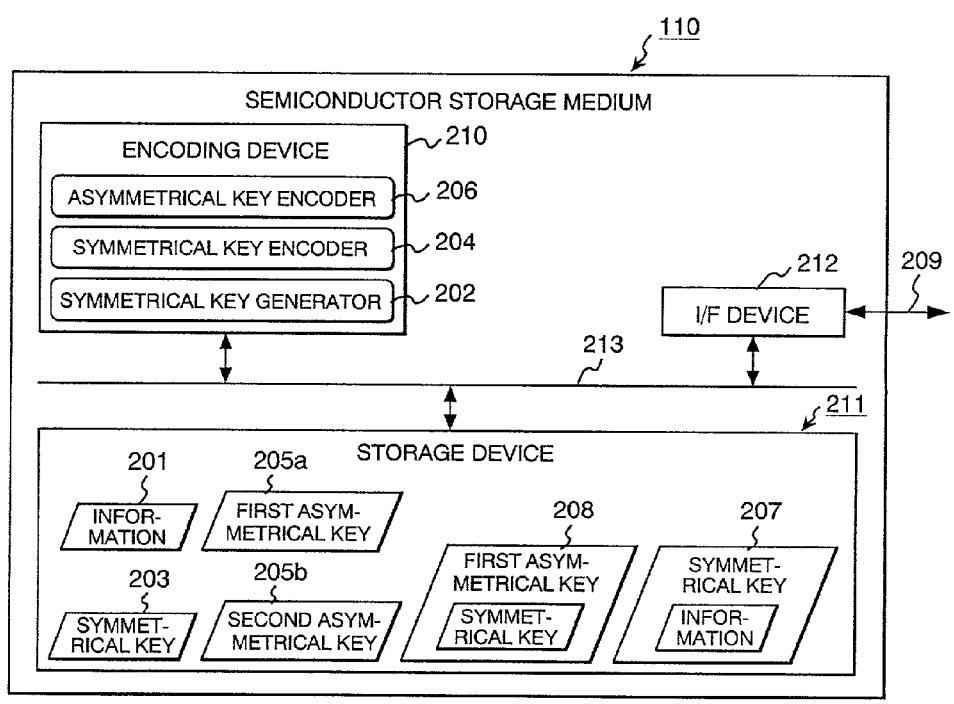
FIG. 2 is a block diagram showing the first embodiment of the storage medium of the present invention.

FIG. 2 is a block diagram showing the first embodiment of the storage medium of the present invention. The semiconductor storage medium 110 is mainly comprised of an encoding device 210, a storage device 211, and as an I/F device 212. In FIG. 2, the encoding device 210 is comprised of an asymmetrical key encoder 206 for encoding by using a method with a different encoding key and a decoding key and referred to as an asymmetrical key code and public key code; a symmetrical key encoder 204 for encoding by a coding method using an encoding key and decoding key that are the same and called a symmetrical key code and common key code; and a symmetrical key generator 204 using some kind of random number generating process. A storage device 211 stores an information 201, symmetrical key 203, first asymmetrical key 205a, second asymmetrical key 205b, symmetrical key 208 encoded with the first asymmetrical key, and encoded information 207 encoded with the symmetrical key. An interface device 212 (hereafter called I/F device) controls the exchange of information between the semiconductor 110 and an external apparatus. A data bus 213 is used to exchange information and control signals between the encoding device 210, a storage device 211 and an I/F device 212. The data bus 209 is used to exchange information and control signals between the semiconductor storage medium 110 and the external apparatus.

The semiconductor storage medium 110 is recorded beforehand with the information peculiar to the storage medium. In other words, the first asymmetrical key 205a and second asymmetrical key 205b unique to the semiconductor storage medium 110 are stored in the storage device 211. One method that may be used for setting the unique information is to write it onto the semiconductor storage medium 110 during the manufacturing stage, so that the unique information cannot be easily rewritten when the semiconductor storage medium 110 has been completed. Another method that may be used is to set the unique information after the semiconductor storage medium 110 has been completed, utilizing a method known by the persons where information is sufficiently controlled and restricted, e.g. a production supervisor.

The first and second asymmetrical keys 205a and 205b of semiconductor storage medium 110 are key data of a method referred to as asymmetrical key encoding and public key encoding. In the encoding method called asymmetrical key encoding and public key encoding, when a text is encoded with the first asymmetrical key and an encoded text generated, the encoded text can then only be decoded using the second asymmetrical key as the decoding key. Further, when a text is encoded with the second asymmetrical key as the encoding key and an encoded text generated, the encoded text can then only be decoded using the first asymmetrical key as the decoding key. Hereafter, the first asymmetrical key will be treated as the public key and the second asymmetrical key treated as the secret key. The reference numeral 207 signifies the encoded information encoded with utilizing the symmetrical key, and the reference numeral 208 signifies the encoded symmetrical key which is encoded utilizing the first asymmetrical key.

Figure 8A:
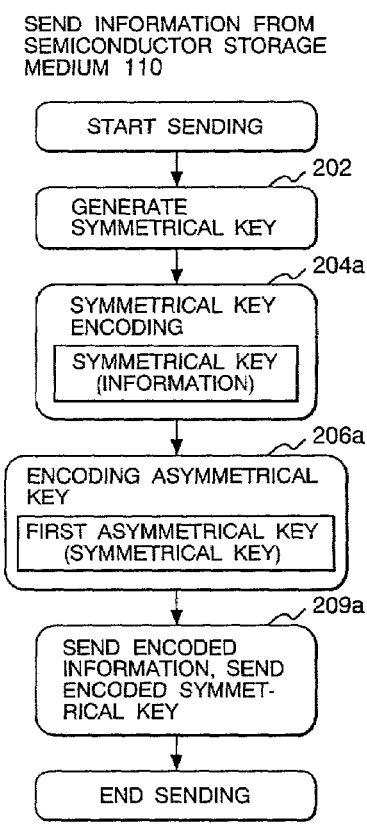
FIG. 8 is a flowchart for describing the operation of the information transfer system of FIG. 3.

The process in this embodiment for transferring information 201 stored in the semiconductor storage medium 110 into the general-purpose information processing device 106 and the semiconductor storage medium access means 107 is described next while referring to FIG. 3 and FIG. 8A.

Figure 3:
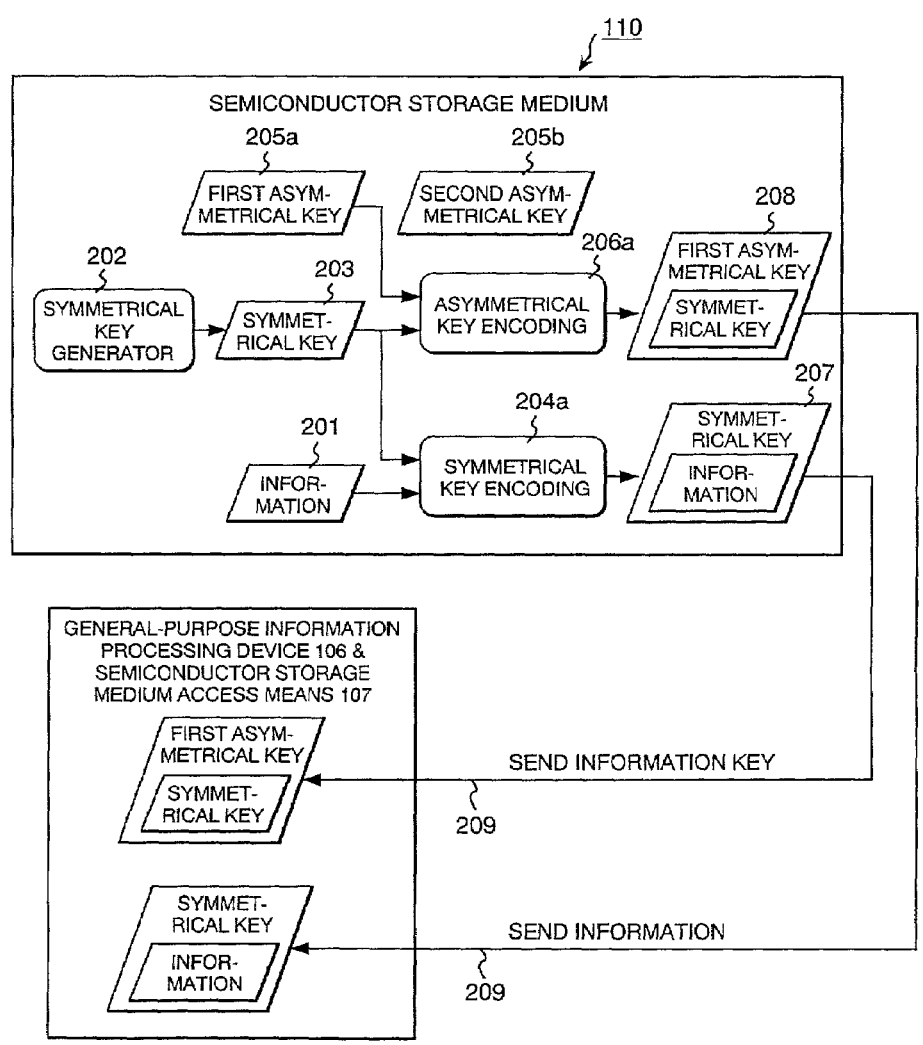
FIG. 3 is a drawing showing the first embodiment of the information transfer function from the storage medium of the information transfer system of the present invention.
Figure 8B:
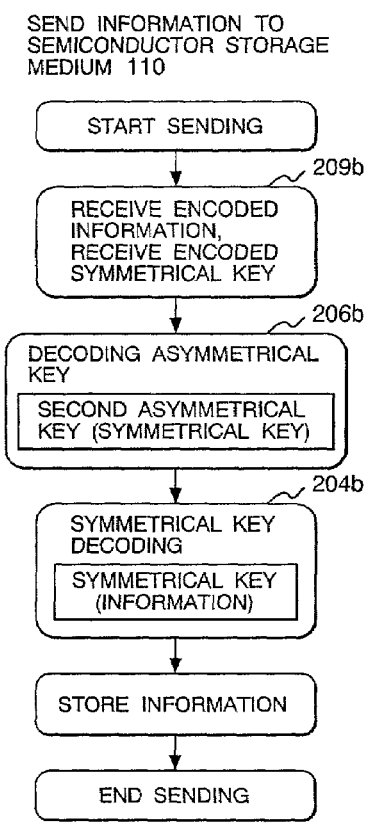
Figure 9:
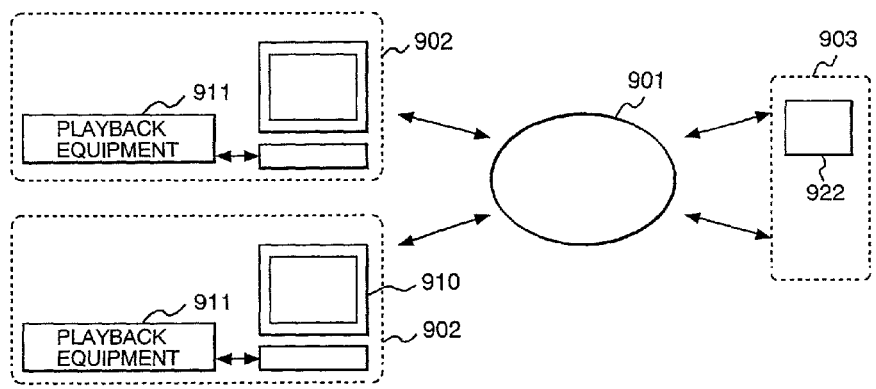
FIG. 9 is a block diagram showing the system of the related art to prevent unauthorized use by copying.
Figure 10:
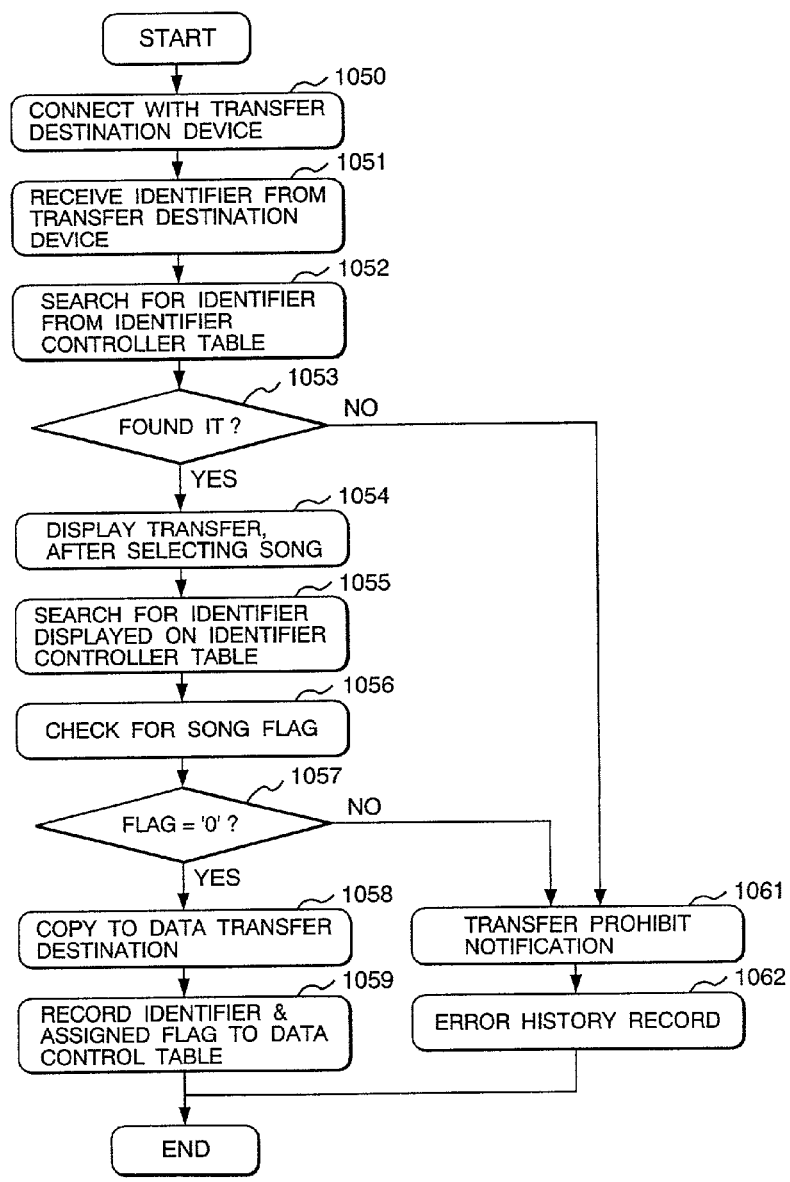
FIG. 10 is a flowchart of the information transfer system of the related art.

FIG. 3 is a drawing showing the first embodiment of the information transfer function from the storage medium of the information transfer system of the present invention. FIGS. 8A and B are flowcharts for describing the operation of the information transfer system of FIG. 3. FIG. 8A shows the operation for transferring information from the semiconductor storage medium 110. FIG. 8B shows the information transfer to the semiconductor storage medium 110.

The semiconductor storage medium 110 performs the following operation in response to a transmit request for information 201 from the general-purpose information processing device 106 and the semiconductor storage medium access means 107 connected to the semiconductor storage medium 110.

In describing the operation while referring to FIG. 2, FIG. 3 and FIG. 8, in step 202 a random number is generated by the function of the encoding device 210 in the semiconductor storage medium 110. The generated random number is utilized as the symmetrical key 203 to encode the information 201. In step 204a, the information 201 is symmetrically encoded with the symmetrical key 203 by the function of the encoding device 210, and the encoded information 207 is generated.

The symmetrical key 203 on the other hand, is asymmetricaly encoded with a first asymmetrical key 205a as the encoding key, by the functioning of the encoding device 210 and the encoded symmetrical key 208 is generated.

The encoded information 207 and the encoded symmetrical key 208 generated in the above procedure are sent in step 209a to the general-purpose information processing device 106 and semiconductor storage medium access means 107 by the function of the IF device 212. The encoded information 207 and the encoded symmetrical key 208 can in this way be stored for backup in the general-purpose information processing device 106 and semiconductor storage medium access means 107.

The encoded information 207 transferred to the general-purpose information processing device 106 and semiconductor storage medium access means 107 by means of the above procedure, cannot be decoded without the symmetrical key 203. The encoded symmetrical key 208 cannot correctly be decoded without the second asymmetrical key 205b. Here, the second asymmetrical key 205b is unique key data of the semiconductor storage medium 110, and is unobtainable by the general-purpose information processing device 106 and semiconductor storage medium access means 107. The general-purpose information processing device 106 and semiconductor storage medium access means 107 therefore cannot decode the symmetrical key 208 and cannot use the information 201.

In other words, even if a copy of the information was made by the general-purpose information processing device 106, after the information 201 stored in the semiconductor storage medium 110 is transferred to the general-purpose information processing device 106 and semiconductor storage medium access means 107, the copy of the encoded information 207 is incapable of being used on the general-purpose information processing device 106 and semiconductor storage medium access means 107, so that unlimited copying of the information 201 by the general-purpose information processing device 106 can in this way be prevented.

The symmetrical key 203 used for encoding the information 201 to be transferred is indispensable for decoding the encoded information 207, so essentially each (piece of) information to be transferred should be controlled and stored in the semiconductor storage medium 110, however the semiconductor storage medium 110 uses the unique information of the first asymmetrical key 205a to make the symmetrical key 203 into an encoded symmetrical key 208, and send it outside the semiconductor storage medium 110 along with the encoded information 207 in step 209a. Control and storage of a plurality of symmetrical keys is therefore not required in the semiconductor storage medium 110 so that only the first and second asymmetrical key pair 205a and 205b need to be controlled and stored. In other words, this brings the advantage that along with easy control of the keys, the storage capacity of the storage device 211 is not taken up by a plurality of symmetrical key data.

Figure 4:
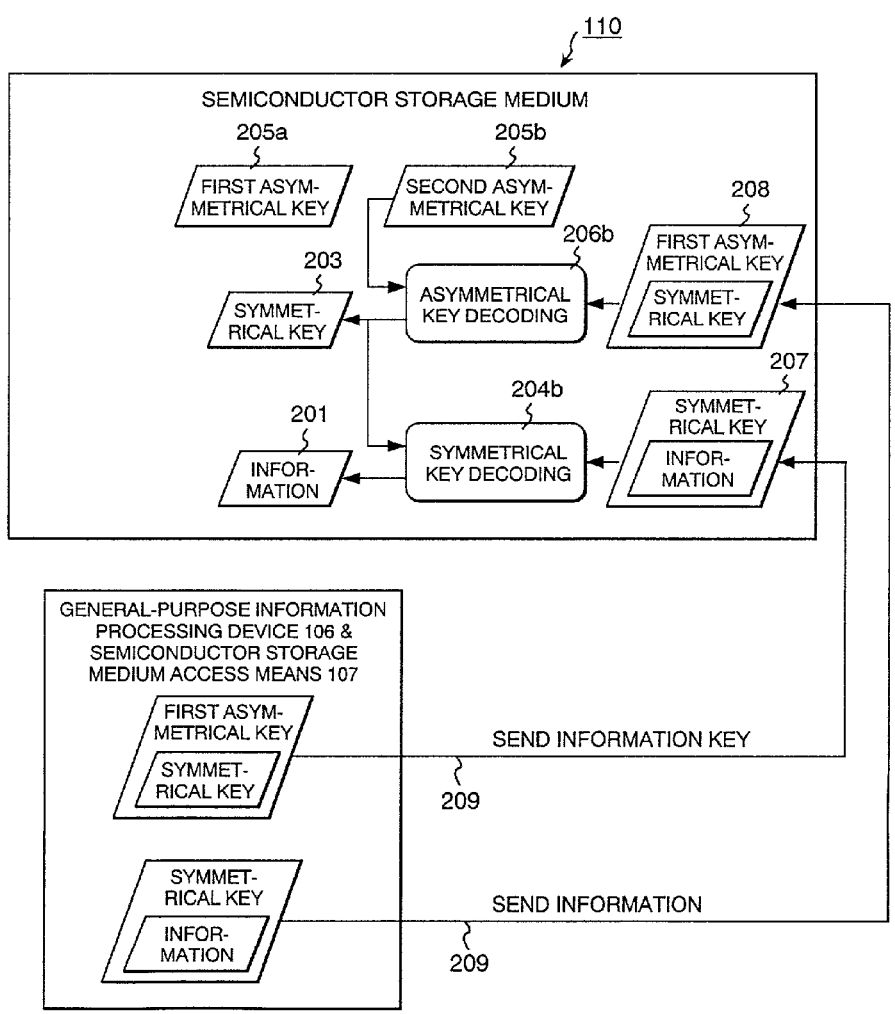
FIG. 4 is a drawing showing the first embodiment of the information transfer function for information transfer to the storage medium of the information transfer system of the present invention.

The process for transferring the encoded information 207 that was sent to the general-purpose information processing device 106 and semiconductor storage medium access means 107 according to the procedure shown in FIG. 3, to the semiconductor storage medium 110 is next explained while referring to FIG. 4 and FIG. 8B.

FIG. 4 is a drawing showing the first embodiment of the information transfer function to the storage medium of the information transfer system of the present invention.

In response to a transfer request from the general-purpose information processing device 106 and semiconductor storage medium access means 107 connected to the semiconductor storage medium 110, the following operations are performed by the semiconductor storage medium 110. Instep 209b, the semiconductor storage medium 110 inputs the encoded information 207 and encoded symmetrical key 208 from the general-purpose information processing device 106 and semiconductor storage medium access means 107 by the function of the I/F device 212. The semiconductor storage medium 110 next in step 206b uses the second asymmetrical key 205b as the decoding key by means of the function of the encoding device 210 and performs asymmetrical decoding of the encoded symmetrical key 208, obtaining the symmetrical key 203. Further, in step 204b, the symmetrical key 203 obtained by the functioning of encoding device 210, is used as a decoding key to perform symmetrical decoding of the encoded information 207, and the information 201 is obtained.

Here, the second asymmetrical key 205b is unique key data of the semiconductor storage medium 110 so that the encoded information 207 sent to the general-purpose information processing device 106 and semiconductor storage medium access means 107 can only be decoded in the semiconductor storage medium 110 which is the transmission source of the encoded information 207. The encoded information 207 sent to the general-purpose information processing device 106 and semiconductor storage medium access means 107 is therefore impossible to be decoded and used in a semiconductor storage medium other than the semiconductor storage medium 110 which is the transmission source of the transferred encoded information 207 so that unconditional copying of the information 201 can in this way be prevented.

The semiconductor storage medium of this embodiment encodes communication data between devices to prevent their unauthorized use by eavesdropping on the communication path, and when information is transferred from a source device to a destination device, that encoding can be performed in a two step key combination of, "Encode and transfer unique (added) value information such as music data." and "Use another key to encode and transfer that key used encoding." However, since a decoding key utilized in the latter part of the combination is impossible (not a shared key) to decode the encoded key at the transfer destination device, the decoding and use of valuable encoded information by the transfer destination device is assured to be impossible, and that information can only be utilized by returning and writing that same information in the transfer source device. Using a fixed key for encoding unique (high added value) information would present problems in terms of security since a fixed code can provide a significant advantage to parties trying to decode the encoded information so that keys required are made by pseudo-random number generators when encoded communications are required. The transfer source device outputs the key generated for encoding unique (high added value) information, along with the encoded unique (high added value) information encoded in a format only decodable by the transfer source device so that key management is simple (control only of unique keys) and further, the storage capacity is not constricted by a plurality of key information.

In other words, while also preventing the unauthorized use of high added value information by copying, the semiconductor storage medium of the present embodiment is also capable of storing unique (high added value) information in for example, large capacity magnetic storage devices for personal computers, inparticular, general-purpose information storage mediums not incorporating a function to prevent the illegal copy of information.

The second embodiment of the present invention is described next while referring to FIG. 5 and FIG. 6. Here, FIG. 5 is an overall block diagram of the information control and transfer system of the present invention, and FIG. 6 is a flowchart showing the operation of the second embodiment of the information transfer system of the present invention.

Figure 5:
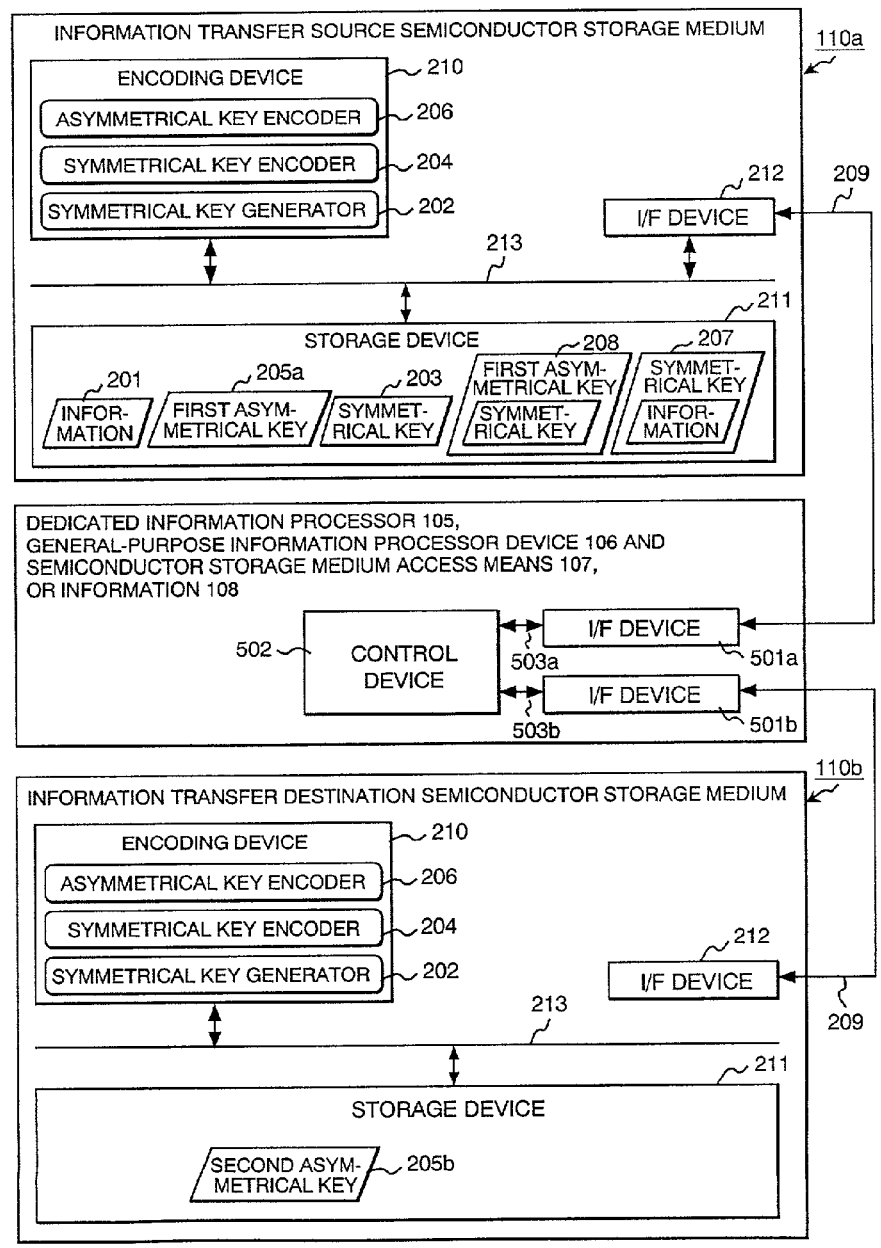
FIG. 5 is an overall block diagram of the information control and transfer system of the present invention.
Figure 6:
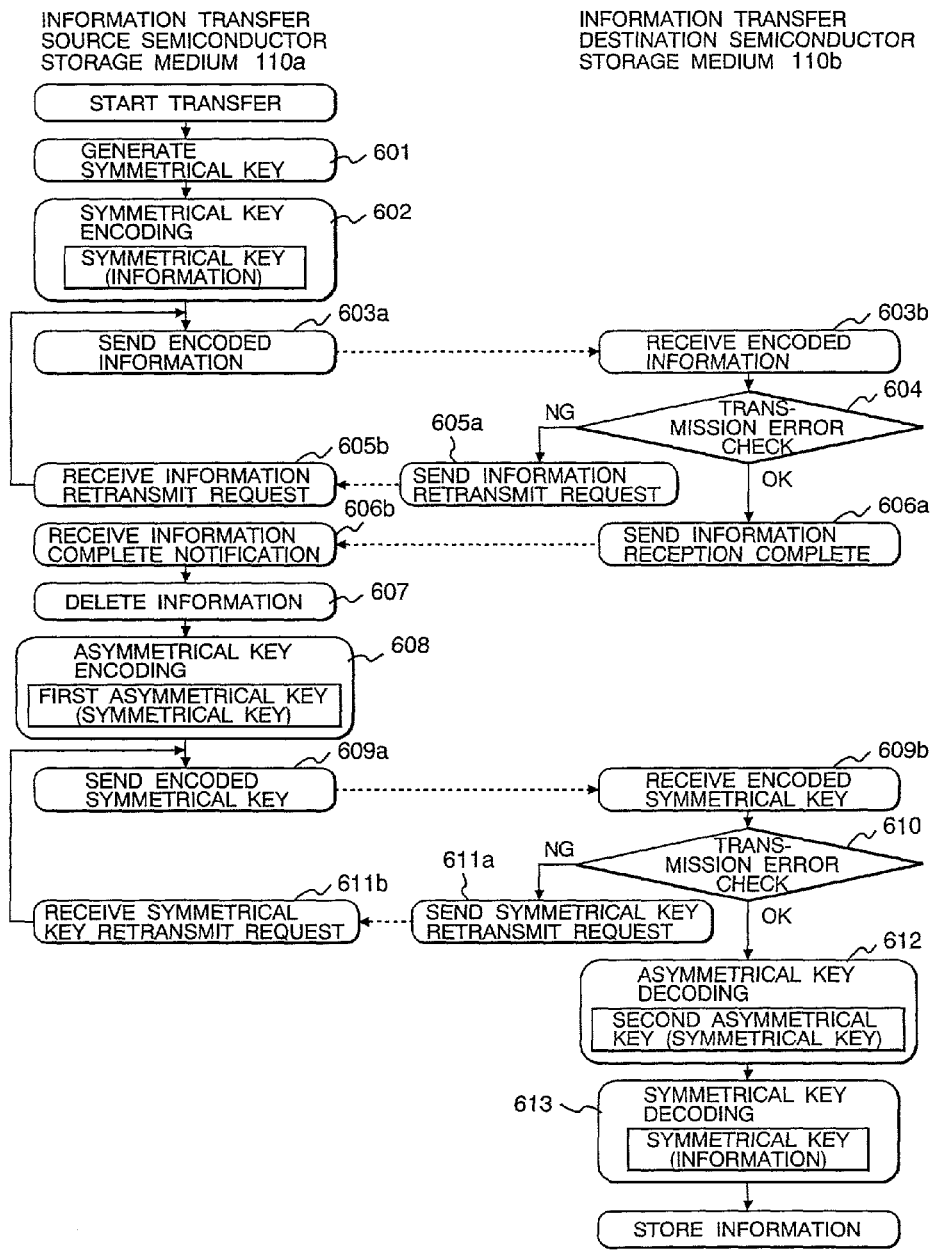
FIG. 6 is a flowchart showing the operation of the second embodiment of the information transfer system of the present invention.

FIG. 5 shows an overall structure consisting of the semiconductor storage medium 110a and 110b, and the same device to control them (dedicated information processing device 105, general-purpose information processing device 106 and semiconductor storage medium access means 107 or information reproducing device 108) of the present embodiment.

In FIG. 5, the information 201, a symmetrical key generator 202, symmetrical key 203, symmetrical key encoder 204, a symmetrical key encoder 206, data bus 209, encoding device 210, storage device 211, I/F device 212 and the data bus 231 are identical to the first embodiment.

A reference numeral 110a denotes the semiconductor storage medium forming the transfer source, 110b is the semiconductor storage medium forming the transfer destination.

A reference numeral 205a denotes the public key (hereafter, first asymmetrical key) utilized in the asymmetrical encoding method of the information transfer destination semiconductor storage medium 110b, and stored beforehand in the storage device 211 of information transfer source semiconductor storage medium 110a. A reference numeral 205b denotes the secret key (hereafter, second asymmetrical key) utilized in the asymmetrical encoding method of the information transfer destination semiconductor storage medium 110b, and stored beforehand in the storage medium 211 of information transfer destination semiconductor storage medium 110b.

The reference numerals 501a and 501b denote the interface devices (hereafter I/F device) controlling the exchange of information and control signals between the dedicated information processing device 105, general-purpose information processing device 106 and semiconductor storage medium access means 107, or information reproducing device 108.

A reference numerals 502 denotes a control circuit controlling the input of information by way of one I/F device 501a so as to be output by another I/F device 501b.

Reference numerals 503a and 503b are reference numerals denoting data buses for exchanging information and control signals between the I/F device 501a and the control device 502.

The procedure when transferring the information 201 stored in the information transfer source semiconductor storage medium 110a to the information transfer destination semiconductor storage medium 110b by way of the dedicated information processing device 105, general-purpose information processing device 106 and semiconductor storage medium access means 107, or information reproducing device 108 is described next while referring to FIG. 6.

At the request for transfer of information 201 by way of the dedicated information processing device 105, general-purpose information processing device 106 and semiconductor storage medium access means 107, or information reproducing device 108 connected to the information transfer source semiconductor storage medium 110a, the information transfer source semiconductor storage medium 110a and the information transfer destination semiconductor storage medium 110b perform the following operation.

In step 601 in FIG. 6, the information transfer source semiconductor storage medium 110a generates a symmetrical key. In other words, it generates a random number by the function of the encoding device 210, and this generated random number is utilized as the symmetrical key 203 for encoding the information 201. In step 602, the information 201 is encoded the symmetrical key 203 by the function of the encoding device 210 and the encoded information 207 is generated.

The encoded information 207 generated in the above procedure is transmitted in step 603a to the information transfer destination semiconductor storage medium 110b by way of the dedicated information processing device 105, general-purpose information processing device 106 and semiconductor storage medium access means 107, or the information reproducing device 108 by means of the functioning of the I/F device 212.

The information transfer destination semiconductor storage medium 110b, receives the encoded information 207 in step 603b, and instep 604 checks the received encoded information 207 for transmission errors. If errors are present, then the information transfer destination semiconductor storage medium 110b sends an information retransmission request to the information transfer source semiconductor storage medium 110a in step 605a. In step 605b, the information transfer source semiconductor storage medium 110a receives the information retransmission request, and in step 603a sends the encoded information again. If there are no transmission errors, the information transfer destination semiconductor storage medium 110b in step 606a sends an information receive completion notification to the information transfer source semiconductor storage medium 110a.

The information transfer source semiconductor storage medium 110a receives the information receive completion notification in step 606b, and deletes the information 201 in step 607. Regarding this information deletion, if data access from an external source by way of the I/F device 212 can be guaranteed to be impossible, then the actual deletion of data from the storage device 211 need not be performed.

Next, in step 608, the information transfer source semiconductor storage medium 110a uses the functions of the encoding device 210 to perform asymmetrical encoding of the symmetrical key 203 using the first asymmetrical key 205a as the encoding key, and generates the encoded symmetrical key 208.

The encoded symmetrical key 208 generated in the above procedure, is sent in step 609a to the information transfer destination semiconductor storage medium 110b by way of the dedicated information processing device 105, or general-purpose information processing device 106 and semiconductor storage medium access means 107, or the information reproducing device 108 by means of the functioning of the I/F device 212.

The information transfer destination semiconductor storage medium 110b, receives the encoded symmetrical key 208 in step 609b, and in step 610 checks the received encoded symmetrical key 208 for transmission errors. If errors are present, then the information transfer destination semiconductor storage medium 110b sends an information retransmission request to the information transfer source semiconductor storage medium 110a in step 611a. In step 611b the information transfer source semiconductor storage medium 110a receives the encoded symmetrical key retransmission request, and returning to step 609a once again sends the encoded symmetrical key. If there are no transmission errors, the information transfer destination semiconductor storage medium 110b in step 612 performs asymmetrical decoding of the encoded symmetrical key 208 using the asymmetrical key 205b as the coding key, and generates the symmetrical key 203. Next, instep 613, the information transfer destination semiconductor storage medium 110b performs symmetrical decoding of the encoded information 207 with the symmetrical key 203 as the coding key, and generates the information 201.

The encoded information 207 output from the information transfer source semiconductor storage medium 110a in the above procedure, cannot be correctly decoded without the symmetrical key 203. Also, the encoded symmetrical key 208 cannot correctly perform decoding without the second asymmetrical key 205b. Here, the second asymmetrical key 205b is unique data of the information transfer destination semiconductor storage medium 110b and cannot be obtained without the same device. Therefore, devices on the same communication path as the encoded information 207, such as the dedicated information processing device 105, or general-purpose information processing device 106 and semiconductor storage medium access means 107, or the information reproducing device 108 cannot decode the encoded symmetrical key 208 and utilize the information 201.

In the process for transferring data between the information transfer source semiconductor storage medium 110a and the information transfer destination semiconductor storage medium 110b, the information 201 present within the information transfer source semiconductor storage medium 110a is voided (step 607) in between the point that the encoded information 207 is sent and the point that the encoded symmetrical key 208 is sent, so that there is no period in which the information 201 is present in both the information transfer source semiconductor storage medium 110a and information transfer destination semiconductor storage medium 110b devices. In this way, at the point that transfer of encoded information 207 is complete, rights to hold the information 203 shifted from the information transfer source semiconductor storage medium 110a to the information transfer destination semiconductor storage medium 110b. After that, transferring of encoded symmetrical key 208 is only possible for semiconductor storage medium 110

In other words, even if communications end abnormally due to a communications error or malicious communication interruption at any point in the data transfer process between the information transfer source semiconductor storage medium 110a and the information transfer destination semiconductor storage medium 110b, it can be assured to be totally impossible for both the information transfer source semiconductor storage medium 110a and the information transfer destination semiconductor storage medium 110b to utilize the information 203.

The example in the present embodiment showed the case of transferring data between a plurality of storage media, however data transfer is not necessarily limited to a plurality of storage media and data transfer may for example also be implemented between devices other than storage media such as between the dedicated information processing device 105 and the storage medium 110 based on the same procedure, or data transfer may also be implemented in a plurality of storage medium, for example, by way of a plurality of information reproducing devices 109 or a plurality of dedicated information processors 105.

Also in the above embodiments, a transmission error check of the received encoded information (step 604) or a transmission error check of the encoded symmetrical key (step 610) was implemented for the encoded information transmission (step 603a, 603b) or the transmission of encoded information keys (step 609a, 609b), however the transmission error check process (step 604 or step 610) may be omitted, and the information reception completion transmission processing (step 606a, 606a) may be performed immediately after receiving the encoded information or the asymmetrical key decoding (step 612) processing may be performed immediately after receiving the encoded symmetrical key 208 when the communication reliability of the data bus 209 between the semiconductor storage medium 110a and 110b is high.

In the example described for the semiconductor storage medium in the present embodiment, the transfer of information 201 is possible between a plurality of semiconductor storage mediums 110a and 110b. The inability to simultaneously use the same information 201 on the plurality of semiconductor storage mediums 110a and 110b is also guaranteed. In other words, in the semiconductor storage mediums of the present embodiment, a combination of encoded communications and precise processing of transactions provides a semiconductor medium that allows information movement between storage mediums while preventing the unauthorized use by copying of information of high added value.

In the first and second embodiments, the encoding may be implemented by dedicated hardware within the encoding device 210, or may be implemented by a CPU within that equipment and software processing. A storage area for key information and work area needed for encoding may be provided solely within the encoding device 210, or the storage device 211 may be utilized.

Also the example in the first and second embodiments used a symmetrical key encoding method in the encoding of the information 201, and an asymmetrical key encoding method in the encoding of the symmetrical key 203 however the invention is not limited by this example, and if a two-step structure of information encoding and encoding of the encoding key is usable, and further if a key to encode that same encoding key can be peculiar to the medium and can be held in secret in the medium, then an optional combination of encoding method, symmetrical key encoding method, and asymmetrical encoding method may be used.

The semiconductor storage medium 110 (or 110a, 110b) is installed with an encoding device 212, as well as an I/F device 212 and a storage device 211 having the essential functions of a storage medium. In a structure where the semiconductor storage medium 110 performs all data exchange with external apparatus only by way of an I/F device 212, and also by forming for example, a structure where the storage device 211, I/F device 212 and the encoding device 212 are on the same semiconductor wafer, direct external access to the data bus 213 connected between these devices is impossible. In this way, the information 201 stored in the storage device 211 of the semiconductor storage medium 110, and the key information 203, 205a, 205b necessary for encoding, are protected from unauthorized access and the tamper-proofing is enhanced.

In the implementation of the semiconductor storage medium 110 shown in the first and second embodiments, the storage device 211 may be a flash memory, and the encoding device 210 and I/F device 212 may be on the same wafer which constitutes a semiconductor chip, sealed for example in the package of the size of a stamp or a credit card. A semiconductor storage medium 110 of the above configuration can serve as an information distribution medium and will prove beneficial and convenient to the user for using information of high added value in the information processing system as shown in FIG. 1.

The first and second embodiments shows a semiconductor storage medium utilizing some manner of semiconductor storage device as the storage device 211. However, this invention is not necessarily limited to a semiconductor storage medium and for example, no problem will arise from use of a magnetic storage medium utilizing a magnetic storage device as the storage device. In such a case for example, by forming the encoding device 210, I/F device 212 and access means to the magnetic storage device on the same semiconductor wafer, access to the data bus 213 from outside the storage medium 110 can be prevented.

In the first and second embodiments, the semiconductor storage medium 110 had the configuration shown in FIG. 2 or FIG. 5. However the semiconductor storage medium 110 may have the configuration shown in FIG. 7.

Figure 7:
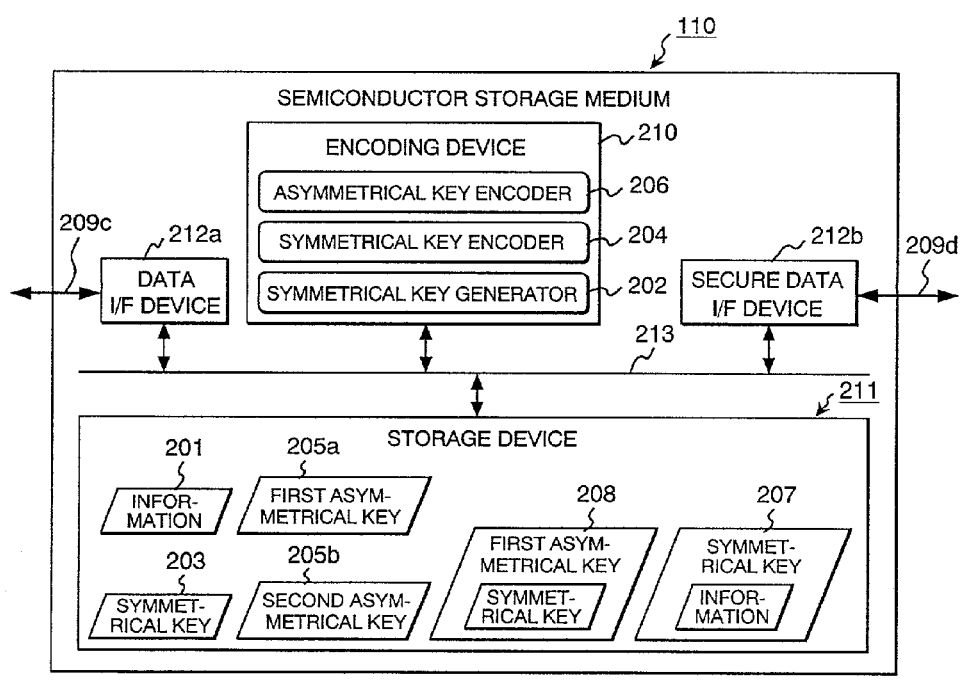
FIG. 7 is a overall block diagram showing another embodiment of the semiconductor storage medium.

FIG. 7 is a overall block diagram showing another embodiment of the semiconductor storage medium. FIG. 7 can be utilized in the examples of the first and second embodiments.

In this figure, structural elements identical to the same elements in FIG. 2 or FIG. 5 have the same reference numerals and their explanation is omitted here.

In this figure, reference numeral 212a denotes a data interface device (hereafter data I/F device) for controlling the usual exchange of data and control signals between the semiconductor storage medium 110 and external apparatus.

The reference numeral 212b denotes a data interface device (hereafter secure data I/F device) for safely controlling the exchange of data and control signals to be exchanged between the semiconductor storage medium 110 and external apparatus.

The reference numeral 209c denotes a data bus for the normal exchange of data and control signals between the semiconductor storage medium 110 and external apparatus. The reference numeral 209d denotes a secure data bus for safely controlling the exchange of data and control signals to be exchanged between the semiconductor storage medium 110 and external apparatus.

A plurality of I/F devices are physically separated as seen from outside the storage medium 110, and for example the setting of the first asymmetrical key 205a and second asymmetrical key 205b into the storage device 211, and though the methods are not related in detail here, recognition procedures such as between the storage medium 110 and external equipment, and the exchange of data important for the security of the system are performed by the secure data I/F device 212b. Tasks that not particularly vital such as transmission and receiving of encoded information 207, are performed by way of the data I/F device 212a.

By providing a plurality of physically separate data I/F in the storage medium 110, in the above structure, a protocol and bus configuration for the exchange of information particularly vital in terms of security can be provided that are not dependent on the exchange of ordinary information.

In the invention as described above, the system comprised of a creator of information or information generating device, information distributing device, communications line to distribute information, semiconductor storage medium, terminal to write information in that semiconductor storage medium connected with the communications line, and information reproducing device to reproduction information stored in the semiconductor storage medium in a state separated from the communications line; the uniqueness of the information can be assured by providing a storage medium and information processing system utilizing that storage medium capable of outputting information stored on a storage medium in a format unusable by other information devices or storage media; along with the capability to move rather than copy the information stored in the storage medium.

In this way, data of high added value can be safely distributed by the semiconductor storage medium, and applications such as for information distribution services are possible.

The present invention as described above, is capable of outputting information stored on a storage medium in a format unusable by other information devices or storage media. The uniqueness of the information can be assured by moving the information stored in the storage medium rather than copying the information. Data of high added value can in this way be safely distributed by the semiconductor storage medium, and applications such as to information distribution services become possible.

What is claimed is:

1. A storage medium comprising:
   a storage device for storing information, an encryption key for use in an encoding operation, and encoded information;
   an input/output device for inputting and outputting information stored in said storage device, said encryption key, and the encoded information; and
   an encoding device for encoding information and decoding encoded information,
   wherein when outputting information stored inside said storage device to outside said storage medium, the information is encoded by using said encryption key, said encryption key is encoded using another encryption key that is part of a pair of asymmetrical keys unique to, and held in secret in, said storage medium, thereby to obtain an encoded encryption key, and both said encoded information and said encoded encryption key are output.

2. A storage medium according to claim 1, wherein said input/output device, said encoding device, and said storage device are constituted on the same semiconductor chip.

3. A storage medium comprising:
   a storage device for storing information, an encryption key for use in an encoding operation, and encoded information;
   an input/output device for inputting and outputting information stored in said storage device, said encryption key, and the encoded information; and
   an encoding device for encoding information and decoding encoded information,
   wherein when outputting information stored inside said storage device to outside said storage device:
   the information is encoded using said encryption key,
   said encryption key is encoded by using another encryption key that is part of a pair of asymmetrical keys unique to, and held in secret in, said storage medium, thereby to obtain an encoded encryption key, and
   only said encoded information is output, and
   when a signal showing that the encoded information received by an external apparatus, said encoded encryption key is output after voiding said information stored in said storage device.

4. A storage medium according to claim 3, wherein said input/output device, said encoding device, and said storage device are constituted on the same semiconductor chip.

5. An information storage system comprising,
   a storage medium including a storage device for storing information, an encryption key for use in an encoding operation, and encoded information; an input/output device for inputting and outputting said information, said encryption key, and the encoded information stored in said storage device; and an encoding device for encoding information and decoding encoded information, and
   an external apparatus coupled to said storage medium, wherein:
   information to be sent to the external apparatus is encoded by utilizing said encryption key,
   the encryption key is encoded utilizing another encryption key that is part of a pair of asymmetrical keys unique to, and held in secret in, said storage medium, and
   the encoded information and the encoded encryption key are sent to, and stored in, said external apparatus, without the another encryption key.

6. An information storage system according to claim 5, wherein said input/output device, said encoding device, and said storage device are constituted on the same semiconductor chip.

7. An information transfer system comprising:
   a storage medium including: a storage device for storing information, an encryption key for use in an encoding operation, and encoded information; an input/output device for inputting and outputting information stored in said storage device, said encryption key, and the encoded information; and an encoding device for encoding information and decoding encoded information, and an external apparatus configured to receive information stored in said storage medium;

wherein:

information to be sent to said external apparatus is encoded utilizing said encryption key, and after receiving a signal showing said encoded information is received by said external apparatus, said information stored in said storage device is voided, and an encoded encryption key that is generated by encoding the encryption key using another encryption key that is part of a pair of asymmetrical keys unique to, and held in secret in, said storage medium, is sent to said external apparatus.

8. An information transfer system according to claim 7, wherein said input/output device, said encoding device, and said storage device are constituted on the same semiconductor chip.

* * * * *